(12) United States Patent
Harada et al.

(10) Patent No.: US 10,193,149 B2
(45) Date of Patent: *Jan. 29, 2019

(54) BATTERY ACTIVE MATERIAL, NONAQUEOUS ELECTROLYTE BATTERY AND BATTERY PACK

(71) Applicant: KABUSHIKI KAISHA TOSHIBA, Tokyo (JP)

(72) Inventors: Yasuhiro Harada, Yokohama (JP); Norio Takami, Yokohama (JP); Hiroki Inagaki, Yokohama (JP); Yorikazu Yoshida, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 103 days.

This patent is subject to a terminal disclaimer.

(21) Appl. No.: 14/830,124

(22) Filed: Aug. 19, 2015

(65) Prior Publication Data

US 2015/0364758 A1    Dec. 17, 2015

Related U.S. Application Data

(63) Continuation of application No. 13/409,754, filed on Mar. 1, 2012, now Pat. No. 9,240,590.

(30) Foreign Application Priority Data

Mar. 22, 2011  (JP) .................................. 2011-063289

(51) Int. Cl.
H01M 4/485    (2010.01)
H01M 2/02     (2006.01)
(Continued)

(52) U.S. Cl.
CPC ......... H01M 4/485 (2013.01); H01M 2/0202 (2013.01); H01M 2/0237 (2013.01);
(Continued)

(58) Field of Classification Search
None
See application file for complete search history.

(56) References Cited

U.S. PATENT DOCUMENTS 5,891,946 A    4/1999  Nohara et al.
6,416,902 B1   7/2002  Miyasaka
(Continued)

FOREIGN PATENT DOCUMENTS

CN    101154729 A    4/2008
JP     6-66141 B2    8/1994
(Continued)

OTHER PUBLICATIONS

Huang et al. Journal of the Electrochemical Society, 152, 1, A186-A190, 2005.*
(Continued)

Primary Examiner — Wojciech Haske
(74) Attorney, Agent, or Firm — Oblon, McClelland, Maier & Neustadt, L.L.P.

(57) ABSTRACT

According to one embodiment, a battery active material includes a complex oxide containing Nb and Ti and an element M. In the active material, the molar ratio (M/Ti) of the element M to Ti satisfies the following formula (I): $0<M/Ti\le 0.5$ (I). In the complex oxide containing Nb and Ti, the molar ratio (Nb/Ti) of Nb to Ti satisfies the following formula (II): $0\le Nb/Ti\le 5$ (II). The element M is at least one selected from the group consisting of B, Na, Mg, Al, Si, S, P, K, Ca, Mo, W, Cr, Mn, Co, Ni, and Fe.

15 Claims, 6 Drawing Sheets

(51) Int. Cl.

| | | |
|---|---|---|
| *H01M 4/131* | (2010.01) | |
| *H01M 4/136* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |
| *C01G 33/00* | (2006.01) | |
| *H01M 10/052* | (2010.01) | |
| *H01M 4/48* | (2010.01) | |
| *H01M 4/02* | (2006.01) | |

(52) U.S. Cl.
CPC ........... *H01M 4/131* (2013.01); *H01M 4/136* (2013.01); *H01M 4/505* (2013.01); *H01M 4/525* (2013.01); *H01M 4/5825* (2013.01); *H01M 10/0525* (2013.01); *C01G 33/00* (2013.01); *C01G 33/006* (2013.01); *C01P 2002/77* (2013.01); *C01P 2006/12* (2013.01); *C01P 2006/40* (2013.01); *H01M 4/483* (2013.01); *H01M 10/052* (2013.01); *H01M 2004/027* (2013.01); *H01M 2004/028* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 6,482,546 | B1 | 11/2002 | Ohshita et al. |
| 2001/0023041 | A1* | 9/2001 | Hayase .................. H01M 6/162 |
| | | | 429/303 |
| 2004/0072072 | A1 | 4/2004 | Suzuki et al. |
| 2007/0120526 | A1 | 5/2007 | Kumeuchi et al. |
| 2008/0076030 | A1 | 3/2008 | Inagaki et al. |
| 2008/0078594 | A1 | 4/2008 | Harada et al. |
| 2009/0081551 | A1* | 3/2009 | Hoshina ................ H01M 4/131 |
| | | | 429/231.95 |
| 2009/0220856 | A1 | 9/2009 | Tian et al. |
| 2012/0052401 | A1 | 3/2012 | Goodenough et al. |
| 2012/0107692 | A1 | 5/2012 | Harada et al. |

FOREIGN PATENT DOCUMENTS

| | | |
|---|---|---|
| JP | 2005-235628 | 9/2005 |
| JP | 2008-159399 | 7/2008 |
| JP | 2010-244819 | 10/2010 |
| JP | 2010-287496 | 12/2010 |
| JP | 2012-99287 | 5/2012 |

OTHER PUBLICATIONS

Wadsley, Acta Cryst. 1961. 14, 660.*
Harada et al. JP 2010/0287496 A, machine translation.*
Spot translation of paragraph [0016] of Harada et al. JP 2010/0287496 A.*
Roth, et al., "Pyrochlore Formation, Phase Relations, and Properties in the $CaO-TiO_2-(Nb, Ta)_2O_5$ Systems", Journal of Solid State Chemistry, vol. 181, 2008, pp. 406-414.
Office Action dated Jun. 4, 2013 in Japanese Application No. 2011-063289 (With English Translation).
Combined Chinese Office Action and Search Report dated Dec. 13, 2013 in Patent Application No. 201210052803.2 with English Translation.
Office Action in corresponding Japanese Application No. 2014-162676, dated Apr. 7, 2015. (w/English Translation).
Office Action in European Application No. 12156481.9, dated Jun. 2, 2015.
J. Colin, et al., "Lithium Insertion in an Orientated Nanoporous Oxide with a Tunnel Structure: $Ti_2Nb_2O_9$", Chemistry of Materials, 2008, vol. 20, pp. 1534-1540.
M.A. Tena, et al., "Influence of niobate structures on the formation of rutile solid solutions [$M^{III}NbO_4-TiO_2$, where $M^{III}$=Al,Fe,Cr]", Materials Research bulletin, Elsevier, vol. 37, No. 11, pp. 1301-1308, Nov. 1, 1992.
B. Balzer, et al., "Solid solutions in the $FeNbO_4-TiO_2$ System", Crystal Research and Technology, vol. 31, No. 1, pp. 93-98, Jan. 1, 1996.
Office Action in Japanese Patent Application No. 2012-026568, dated Apr. 21, 2015. (w/English Translation).
J. Colin, et al., "A Novel Layered Titanoniabate $LiTiNbO_5$; Topotactic Synthesis and Electrochemistry Versus Lithium", Inorganic Chemistry, 2006, vol. 45, No. 18, pp. 7217-7223.
Office Action dated Aug. 13, 2015 in Indian Patent Application No. 334/DEL/2012.
Office Action dated Nov. 4, 2015 in Japanese Patent Application No. 2014-162676 (with English language translation).
Combined Office Action and Search Report dated Nov. 16, 2015 in Chinese Patent Application No. 201210052803.2 (with English language translation).
Madeleine Gasperin, "Affinement de la structure de $TiNb_2O_7$ et répartition des cations" Journal of Solid State Chemistry, vol. 53, 1984, pp. 144-147 (with English Summary).
European Office Action dated Mar. 17, 2017 in Patent Application No. 12 156 481.9.
R. J.Cava et al., "Lithium Insertion in Wadsley-Roth Phases Based on Niobium Oxide", Journal of the Electrochemical Society, vol. 130, No. 12, XP001285518, Dec. 1, 1983, pp. 2345-2351.

* cited by examiner

PRIOR ART

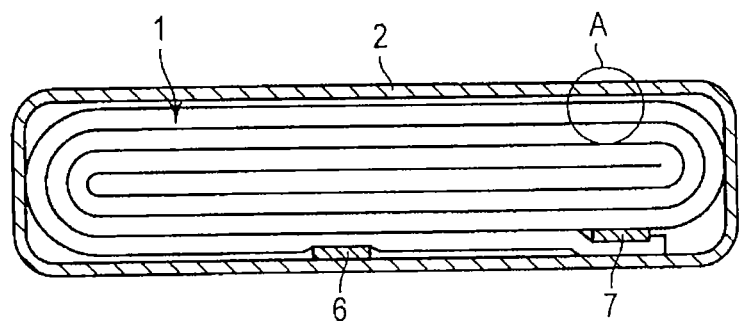
F I G. 3
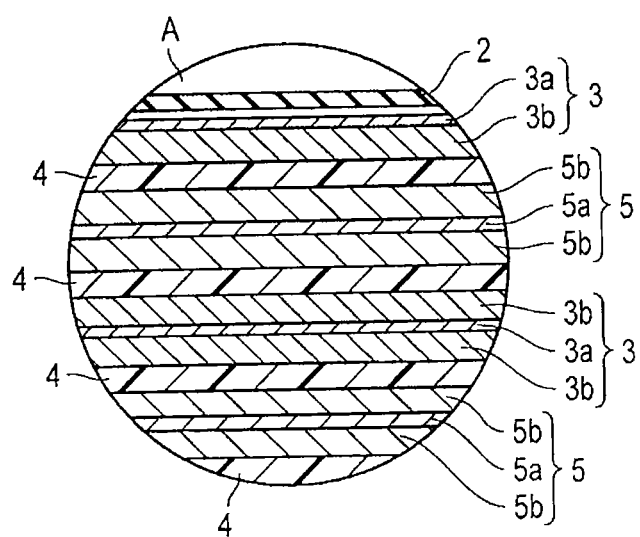
F I G. 4

BATTERY ACTIVE MATERIAL, NONAQUEOUS ELECTROLYTE BATTERY AND BATTERY PACK

This application is a Continuation of U.S. application Ser. No. 13/409,754, filed on Mar. 1, 2012.

CROSS-REFERENCE TO RELATED APPLICATIONS

This application is based upon and claims the benefit of priority from prior Japanese Patent Application No. 2011-063289, filed Mar. 22, 2011, the entire contents of which are incorporated herein by reference.

FIELD

Embodiments described herein relate generally to a battery active material, a nonaqueous electrolyte battery using the active material and a battery pack.

BACKGROUND

Nonaqueous electrolyte batteries such as a lithium ion secondary battery have been recently developed as high-energy density batteries. These nonaqueous electrolyte batteries are expected as power sources for hybrid vehicles and electric vehicles. Further, they are expected as uninterruptible power supply for base stations for portable telephone, and the like. For this, the nonaqueous electrolyte battery is desired to have other performances such as rapid charge/discharge performances and long-term reliability. A nonaqueous electrolyte battery enabling rapid charge/discharge not only remarkably shortens the charging time but also makes it possible to improve performances of the motive force of a hybrid vehicle and the like and to efficiently recover the regenerative energy of them.

In order to enable rapid charge/discharge, it is necessary that electrons and lithium ions can migrate rapidly between the positive electrode and the negative electrode. When a battery using a carbon based material in the negative electrode repeats rapid charge/discharge, dendrite precipitation of metal lithium is occurred on the electrode, raising the fear as to heat generation and fires caused by internal short circuits.

In light of this, a battery using a metal composite oxide in place of a carbonaceous material in the negative electrode has been developed. Particularly, in a battery using a titanium based oxide as the negative electrode active material, rapid charge/discharge can be performed stably. Such a battery also has a longer life than those using a carbonaceous material.

However, titanium based oxide has a higher potential than carbonaceous material based on metal lithium. Further, titanium based oxide has a lower capacity per mass. Thus a battery using titanium based oxide as the negative electrode active material has a problem that the energy density is low.

The potential of the electrode using titanium based oxide is about 1.5 V based on metal lithium and is nobler than that of the electrode using carbonaceous material. The potential of titanium based oxide is due to the redox reaction between $Ti^{3+}$ and $Ti^{4+}$ when lithium is electrochemically inserted and released and is therefore limited electrochemically. Further, there is the fact that the inserted and released of lithium ions by rapid charge/discharge is possible at an electrode potential as high as about 1.5 V. It is therefore substantially difficult to drop the potential of the electrode to improve energy density.

As to the capacity of the battery per unit mass, the theoretical capacity of titanium dioxide having an anatase structure is about 165 mAh/g and the theoretical capacity of a lithium-titanium composite oxide such as $Li_4Ti_5O_{12}$ is also about 180 mAh/g. On the other hand, the theoretical capacity of a general graphite based electrode material is 385 mAh/g or more. Therefore, the capacity density of titanium based oxide is significantly lower than that of the carbon based material. This is due to a reduction in substantial capacity because there are only a small number of equivalent lithium-absorbing sites in the crystal structure and lithium tends to be stabilized in the structure.

In view of the above situation, novel electrode materials containing Ti and Nb have been developed. Such a material is expected to have a high charge/discharge capacity. Particularly, a complex oxide represented by $TiNb_2O_7$ has a high theoretical capacity exceeding 300 mAh/g. However, complex oxides such as $TiNb_2O_7$ have a problem that the productivity is low.

BRIEF DESCRIPTION OF THE DRAWINGS

FIG. 3 is a sectional view of a flat type nonaqueous electrolyte battery according to a second embodiment;

FIG. 4 is an enlarged sectional view of the part A of FIG. 3;

DETAILED DESCRIPTION

In general, according to one embodiment, there is provided a battery active material comprising a complex oxide containing Nb and Ti and an element M. In the active material, the molar ratio (M/Ti) of the element M to Ti satisfies the following formula (I).

$$0 < M/Ti \leq 0.5 \quad (I)$$

Further, the molar ratio (Nb/Ti) of Nb to Ti satisfies the following formula (II) in the complex oxide containing Nb and Ti.

$$1 \leq Nb/Ti \leq 5 \quad (II)$$

Here, the element M is at least one selected from the group consisting of B, Na, Mg, Al, Si, S, P, K, Ca, Mo, W, Cr, Mn, Co, Ni, and Fe.

An embodiment will be explained with reference to the drawings.

First Embodiment

In the first embodiment, a battery active material comprises a complex oxide containing Nb (Nb) and Ti (Ti) and an element M. The element M is at least one selected from the group consisting of B, Na, Mg, Al, Si, S, P, K, Ca, Mo, W, Cr, Mn, Co, Ni and Fe.

In the active material, the molar ratio (M/Ti) of the element M to Ti satisfies the following formula (I).

$$0 < M/Ti \leq 0.5 \qquad (I)$$

In the complex oxide containing Nb and Ti, the molar ratio (Nb/Ti) of Nb to Ti satisfies the following formula (II).

$$1 \leq Nb/Ti \leq 5 \qquad (II)$$

The complex oxide containing Nb and Ti mainly has a monoclinic crystal structure. As an example, typical views of the crystal structure of monoclinic $TiNb_2O_7$ are shown in FIG. 1 and FIG. 2.

Figure 1:
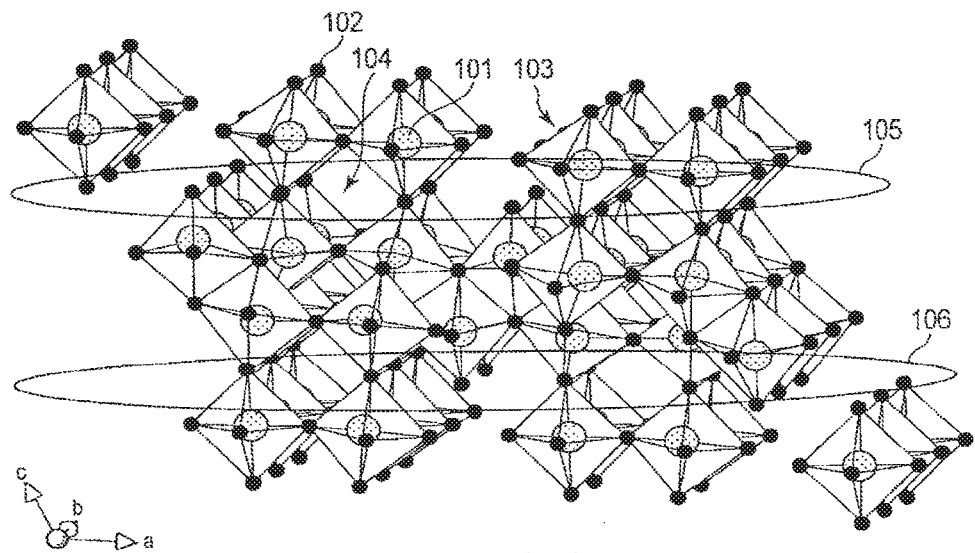
FIG. 1 is a typical view showing the crystal structure of monoclinic $TiNb_2O_7$.
Figure 2:
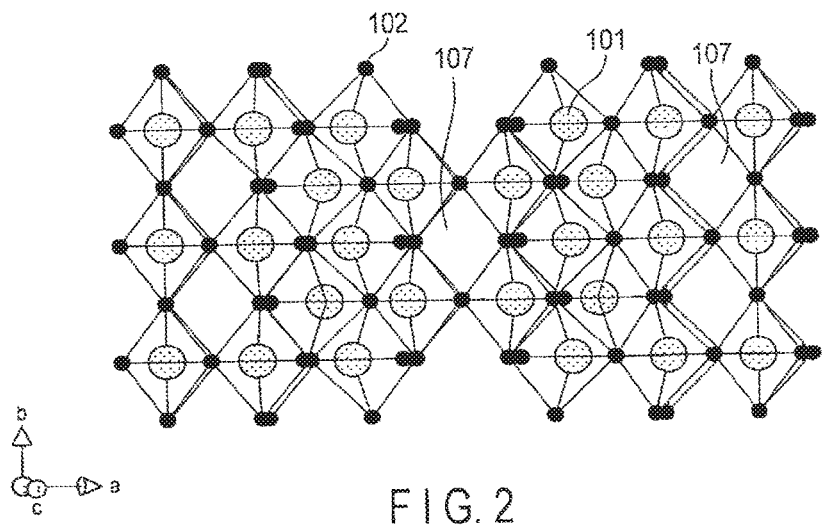
FIG. 2 is a typical view of the crystal structure of FIG. 1 as viewed from another direction.

As shown in FIG. 1, in the crystal structure of monoclinic $TiNb_2O_7$, a metal ion 101 and an oxide ion 102 form a skeleton structure part 103. As the metal ion 101, Nb ions and Ti ions are arranged at random in the following ratio; Nb:Ti=2:1. These skeleton structure 103 are alternately arranged three-dimensionally, thereby a void 104 is formed among the skeleton structure 103. This void 104 is able to serve as a host for lithium ions.

Regions 105 and 106 are parts having two-dimensional channels in [100] and [010] directions. As shown in FIG. 2, the crystal structure of monoclinic $TiNb_2O_7$ has a void 107 along a [001] direction. This void 107 has a tunnel structure, so it is favorable for the conduction of lithium ions. Therefore, the void 107 can be a conductive path in a [001] direction connecting region 105 and region 106. This conductive path makes it possible for the lithium ions to migrate between regions 105 and 106.

Thus, the structure of the monoclinic crystal has a large equivalent insertion space for lithium ions and is structurally stable. Further, the structure has the regions each having a two-dimensional channel in which lithium ions are rapidly diffused, and has the conductive path in a [001] direction connecting these regions. Such crystal structure has the insertion space having improved capability to be inserted/released with lithium. Thus, the crystal structure has substantially increased space for a lithium ion to be inserted/released. Therefore, it is possible to provide a high capacity and a high rate performance.

The complex oxide containing Nb and Ti and contained in the battery active material in this embodiment preferably has, though is not limited to, a crystal structure which has space group C2/m symmetry and atomic coordination described in Journal of Solid-State Chemistry 53, pp. 144-147 (1984).

When lithium ions are inserted in the void 104, the metal ion 101 constituting the skeleton is reduced to a trivalent one, thereby maintaining electric neutrality of a crystal. In the complex containing Nb and Ti in this embodiment, not only a Ti ion is reduced from tetravalent to trivalent but also an Nb ion is reduced from pentavalent to trivalent. For this, the number of reduced valences per mass of the active material is large. Therefore, the complex oxide containing Nb and Ti can maintain electric neutrality of the crystal even if more lithium ions are inserted. Thus, the complex oxide containing Nb and Ti can be more improved in energy density than a compound such as Ti oxide only containing a tetravalent cation. The theoretical capacity of the complex oxide containing Nb and Ti in this embodiment is about 387 mAh/g, which is a value two or more times that of a Ti oxide having a spinel structure.

Further, the complex oxide containing Nb and Ti has a lithium absorption potential of about 1.5 V (vs. Li/Li$^+$) and therefore enables rapid charge/discharge to be repeated stably in the battery.

The mentioned above, by using the complex oxide containing Nb and Ti, a battery active material having excellent rapid charge/discharge performance and a high energy density can be provided.

In the embodiment, the complex oxide containing Nb and Ti has the molar ratio (Nb/Ti) of Nb to Ti in the range of 1 to 5. When the molar ratio (Nb/Ti) is less than 1, a uniform complex oxide phase of Nb and Ti is not obtained but phase separation occurs, causing deteriorated electrode performance. When the molar ratio (Nb/Ti) is more than 5, the amount of Nb to the amount of Li which can be inserted per unit grid is excessive and therefore, the electrode energy density per mass is dropped.

In the meantime, the complex oxide containing Nb and Ti has a melting point as high as about 1450° C. (see, for example, C. M. Reich et. al., FUEL CELLS No. 3-4, 1 pp. 249-255 [2001]). Therefore, in a process of synthesizing a complex oxide containing Nb and Ti, if the sintering is carried out at low temperatures, a complex oxide containing Nb and Ti having low crystallinity is obtained. The complex oxide containing Nb and Ti having low crystallinity tends to have a low capacity and deteriorated rate performance (see JP-A No. 2010-287496, hereinafter referred to as "Reference Document 1"). However, it is necessary to sintering at a temperature of about 1300° C. to improve the crystallinity of the complex oxide containing Nb and Ti, giving rise to a problem of low productivity.

Further, many conventional electrode materials for batteries can be synthesized by sintering at about 600 to 1000° C. Therefore, conventional production equipment can not implement a sintering operation at a temperature as high as 1300° C. Accordingly, it is necessary to introduce equipment enabling a sintering operation at a temperature as high as 1300° C. to obtain a highly crystalline complex oxide containing Nb and Ti industrially, giving rise to a problem of high cost.

According to the embodiment, the melting point of a complex oxide containing Nb and Ti can be dropped by adding an element M in the active material. The element M is at least one selected from the group consisting of B, Na, Mg, Al, Si, S, P, K, Ca, Mo, W, Cr, Mn, Co, Ni and Fe. The active material may contain only one kind of these metals or two or more kinds of these metals as the element M. The element M is preferably at least one selected from Mg and Mo.

The element M may exist as a solid solution in which a part of Nb in a crystal lattice of the complex oxide containing Nb and Ti is substituted by the element M. Alternatively, the element M may not exist uniformly in the crystal lattice, but may exist in a segregated state among grains and/or in a domain. Alternatively, one part of the element M may exist as a solid solution and another part of element M may exist in a segregated state. In any state, the melting point of the complex oxide containing Nb and Ti can be dropped when the element M exists in the active material together with the complex oxide.

The above mentioned elements which may be used as the element M undergo no redox reaction at the charge/discharge potential of a battery using the complex oxide containing Nb and Ti as an active material. Therefore, these elements are preferably used because they do not affect the potential flatness of a battery.

The inventors of the present invention have found that a part of Nb contained in the complex oxide containing Nb and Ti does not contribute to a redox reaction. Therefore, by substituting the part of Nb which does not contribute to a redox reaction by the element M, the melting point can be lowered without any reduction in capacity. When the element M is comprised in the active material such an amount that the molar ratio (M/Ti) is 0.5 or less (excluding zero), Nb which does not contribute to an electrode reaction can be substituted and therefore, the melting point can be lowered without any reduction in capacity. When the element M is comprised in the active material such an amount that the molar ratio (M/Ti) is more then 0.5, the amount of Nb required for the amount of Li which can be inserted is reduced, so that the capacity of the active material is reduced.

Further, by using an element lighter than Nb as the element M, the mass of the active material is reduced and then the energy density per mass can be improved.

The complex oxide containing Nb and Ti is preferably a complex oxide represented by the formula $Li_xTiNb_{2-y}M_yO_{7+\delta}$ ($0 \leq x \leq 5$, $0 \leq y \leq 0.5$, $-0.3 \leq \delta \leq 0.3$). Because the complex oxide represented by the formula $Li_xTiNb_{2-y}M_yO_{7+\delta}$ has one cation which can be reduced from tetravalent to trivalent per chemical formula and has a maximum of two cations which can be reduced from pentavalent to trivalent per chemical formula. Thus, a maximum of five lithium ions can be inserted theoretically into the complex oxide. For this, x is in the range of 0 to 5 in the above formula. When all elements M comprised in the active material exist as a solid solution, i.e., when all elements M comprised in the active material are substituted for Nb in the crystal lattice of the complex oxide containing Nb and Ti, y is 0.5. On the other hand, when the element M comprised in the active material does not exist uniformly in the crystal lattice, but is segregated, y is 0. $\delta$ varies between $-0.3$ and $0.3$ depending on the reduction condition of the complex oxide containing Nb and Ti. When w is defined as $w=7+\delta$, w is in a range of 6.7 to 7.3. When w is less than 6.7, Nb is reduced in advance, bringing about deteriorated electrode performance and also, it is likely that phase separation may occur. A w value up to 7.3 is a range of measurement error.

The complex oxide represented by the formula $Li_xTiNb_{2-y}M_yO_{7+\delta}$ ($0 \leq x \leq 5$, $0 \leq y \leq 0.5$, $-0.3 \leq \delta \leq 0.3$) is desirable because capacity is not substantially reduced even if a part of Nb is substituted by M, and its electronic conductivity can be expected to be improve due to substitution by a heteroatom.

The complex oxide containing Nb and Ti is more preferably a complex oxide represented by the formula $Li_xTiNb_{2-y}(Mo_{0.75y}Mg_{0.25y})O_{7+\delta}$ ($0 \leq x \leq 5$, $0.01 \leq y \leq 0.5$, $-0.3 \leq \delta \leq 0.3$). Such a complex oxide has lower melting point and enables high crystallinity at a sintering temperature of 800° C. or less.

Moreover, the complex oxide containing Nb and Ti and comprised in the active material has a melting point of preferably 1350° C. or less and more preferably 1250° C. or less. When the complex oxide containing Nb and Ti has a melting point of 1350° C. or less, high crystallinity can be obtained at a low sintering temperature. For this, the complex oxide containing Nb and Ti can be synthesized by utilizing the existing equipment. It can be also synthesized at a low sintering temperature and therefore has the benefit in providing high productivity.

<Production Method>

The active material of the embodiment may be produced in the following method.

First, starting materials are mixed. As the starting materials for the complex oxide containing Nb and Ti, oxides or salts containing Li, Ti and Nb are used. As starting materials for the element M, oxides or salts containing at least one element selected from the group consisting of B, Na, Mg, Al, Si, S, P, K, Ca, Mo, W, Cr, Mn, Co, Ni and Fe are used. In the case of synthesizing, for example, an oxide represented by the formula $Li_xTiNb_{2-y}(Mo_{0.75y}Mg_{0.25y})O_{7+\delta}$, MgO and either $MoO_2$ or $MoO_3$ may be used as the starting material. The salt to be used as the starting material is preferably decomposed at a relatively low temperature to form oxides. Examples of such salts include carbonates and nitrates.

The starting materials are blended such that the molar ratio (M/Ti) is 0.5 or less (excluding zero). They are preferably blended in such a molar ratio that all charge of the crystal in which a part of Nb is substituted by the element M is kept neutral. This ensures that a crystal which maintains the crystal structure represented by the formula $Li_xTiNb_2O_7$ can be obtained. Even in a method of adding M in such a manner that all charge is not kept neutral, a crystal which maintains the crystal structure of $Li_xTiNb_2O_7$ in a large part thereof can be obtained by adjusting the amount of M.

Next, the obtained mixture is milled to obtain a mixture as uniformly as possible. Then, the obtained mixture is sintered. The sintering is performed at a temperature range of 500 to 1200° C. for a total of 10 to 40 hours. According to the embodiment, a highly crystalline complex oxide can be obtained at a temperature of 1200° C. or less. The sintering is more preferably performed at a temperature range of 800 to 1000° C. If the sintering temperature is 1000° C. or less, the conventional equipment can be utilized.

The method mentioned above makes it possible to obtain a complex oxide containing Nb and Ti and represented by the formula $Li_xTiNb_{2-y}M_yO_{7+\delta}$ ($0 \leq x \leq 5$, $0 \leq y \leq 0.5$, $-0.3 \leq \delta \leq 0.3$).

Lithium ions may be inserted into the complex oxide containing Nb and Ti by charging a battery. Alternatively, the complex oxide may contain lithium before charging a battery by using a compound containing lithium such as lithium carbonate as a starting material for the synthesize of a complex oxide containing Nb and Ti.

<Measurement of Melting Point>

The melting point of the complex oxide containing Nb and Ti may be determined by differential scanning calorimetry (DSC). This method is a thermal analysis method for measuring, for example, melting point by measuring a difference in calories between a measuring sample and a standard material. In this method, a difference in heat flow between the measuring sample and the standard sample is detected when the measuring sample produces a change associated with heat balance. Therefore, as a result of the DSC measurement, a curve is obtained in which the ordinate is the heat flow (for example, mW) and the abscissa is the temperature or time. An upward peak appears as an exothermic reaction and a downward peak appears as an endothermic reaction. These peaks each correspond to the transition of the sample and the curve is used for enthalpy calculation. An endothermic peak is observed at the melting point. Because, generally, the peak top is regarded as the melting point (Tm), the peak top of the endothermic peak in DSC is also defined as the melting point in this embodiment. The measuring sample is melted, and then, the melted sample is gradually cooled to sufficiently crystallize prior to measurement, whereby the melting point can be easily determined. The melting point is measured more easily as the temperature rise rate during measuring is slower. The measuring sample is filled in an alumina pan. The measuring sample is filled carefully in a fully densified state because exact measurement cannot be made if clearances exist in the measuring sample.

<Measurement of Powder X-Ray Diffraction>

The crystal structure of the complex oxide containing Nb and Ti has a crystal structure of Nb titanate (i.e. monoclinic system) as a main phase. The crystal structure can be detected by powder X-ray diffraction (XRD).

The XRD measurement of the active material is carried out in the following manner. First, an target sample is ground until the average particle diameter reaches about 5 μm. The average particle diameter can be found by the laser diffraction method. The ground sample is filled in a holder part which is formed on a glass sample plate and has a depth of 0.2 mm. At this time, much care is necessary to fill the holder part fully with the sample. Further, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too much or too little amount of the sample to be filled, thereby preventing any rises and dents in the basic plane of the glass holder.

Then, the glass plate filled with the sample is set to a powder X-ray diffractometer. The measurement is carried out by using Cu-Kα rays to obtain a XRD pattern.

When the sample has a high orientation, there is the possibility of a shift of a peak position and variation in intensity ratio, depending on how the sample is filled. In such a case, the sample is filled in a glass capillary. The glass capillary is set on a rotating stand and then the measurement is carried out. Such a method is more preferable because the orientation of the sample is alleviated. The measurement using such a method eliminates a difference in the results of the measurement between operators, enabling high reproducibility.

When the active material taken out of the electrode by disintegrating the electrode is subjected to XRD measurement, the measurement may be carried out in the following manner.

In order to analyze the crystal state of the active material, the active material is put into a state in which lithium ions are perfectly released from the complex oxide containing Nb and Ti. When the active material was used, for example, in the negative electrode, the battery is put into a fully discharged state. However, there is the case where lithium ions remain unremoved even in a discharged state.

Next, the battery is disintegrated in a glove box filled with argon. Then, the disintegrated battery is washed with an appropriate solvent. For example, ethyl methyl carbonate is preferably used as the solvent. The washed electrode may be cut into a size having the same area of the holder of the powder X-ray diffractometer and applied directly to the glass holder. At this time, XRD is measured in advance with regard to the electrode substrate constituted of metal foil to determine a position where a peak originated from the substrate appears. Furthermore, it is necessary to determine in advance whether or not there are peaks originated from the ingredients such as a conductive agent and binder. When the peak of the substrate is overlapped on the peak of the active material, it is desired to separate the active material from the substrate prior to the measurement. This is to separate the overlapped peaks and to measure the peak intensity quantitatively. Of course, the procedure may be omitted if these data have been determined in advance. Although the electrode may be separated physically, it is easily separated by applying ultrasonic wave in a solvent. Then, the electrode recovered in this manner is subjected to the XRD to obtain XRD pattern of the active material.

The results of the XRD obtained in this manner are analyzed by the Rietveld method. In the Rietveld method, a diffraction pattern is calculated from a crystal structure model assumed in advance. Then, the diffraction pattern is fully fitted to actual values so as to improve the accuracy of parameters (for example, lattice constant, atomic coordination and occupation) relating to the crystal structure. Therefore, the features of the crystal structure of the synthesized material can be investigated.

<Measurement of the Molar Ratio>

The molar ratios M/Ti and Nb/Ti can be measured in the following manner. The molar ratio of elements can be calculated using principally a result of inductively coupled plasma (ICP) analysis. When these molar ratios are measured about an electrode body, a part comprising the electrode active material is separated from the electrode substrate (for example, a metal foil), for example, by ultrasonically cleaning. The separated part is heated in the air for a short time (500° C. for about 1 hour) to burn out unnecessary components such as a binder component and carbon. The residue is dissolved in an acid, and the solution is subjected to ICP analysis. The molar ratio of the constituted elements is not changed by heating. Therefore, the molar ratio can be measured by the above mentioned method.

<Analysis of the State of the Element M>

The state of the crystal phase can be analyzed by using the powder X-ray diffraction (XRD) to thereby determine whether or not the added element M is substituted in the complex oxide to form element M substituted solid solution. Specifically, the presence or absence of an impurity phase and variation in lattice constant (reflects the ionic radius of the element M to be added) can be analyzed by the XRD. However, when the element M is added in a trace amount, there is the case where the distribution of the element M cannot be determined. In this case, the state of distribution of the added elements can be known by transmission electron microscopy (TEM) observation and electron probe microanalysis (EPMA) measurement. It is thereby determined whether the added element is uniformly distributed in a solid or segregated.

<Particle Diameter and BET Specific Surface Area>

The average particle diameter of the complex oxide containing Nb and Ti in this embodiment may be varied corresponding to desired battery performances without any particular limitation. The BET specific surface area of the complex oxide containing Nb and Ti in this embodiment is preferably 0.1 $m^2/g$ or more and less than 100 $m^2/g$ though no particular limitation is imposed.

When the specific surface area is 0.1 $m^2/g$ or more, the contact area with the electrolytic solution can be secured. Thus, good discharge rate performances are easily obtained and also, a charge time can be shortened. When the specific surface area is less than 100 $m^2/g$, reactivity with the electrolytic solution is suppressed and therefore, the life performances can be improved. Further, this limited specific surface area allows a slurry containing the active material to be coated with facility in the production of an electrode, which will be described later.

Here, in the measurement of the specific surface area, a method comprising the following step is used:

a molecule of which the adsorption occupying area is known is made to adsorb to the surface of the powder particle at the temperature of liquid nitrogen; and the specific surface area of the powder particle is calculated from the amount of the molecule adsorbed on it. A method that is most frequently used to obtain the specific surface area is the BET method. The BET method uses the low-temperature and low-humidity physical adsorption of an inert gas and is based on the well-known theory for the calculating specific surface area. The theory is obtained by extending the Langmuir theory which is monolayer adsorption theory to multilayer adsorption. The specific surface area calculated in this manner is referred to as the "BET specific surface area".

According to the above embodiment, a battery active material which is superior in productivity and has excellent rapid charge/discharge performance and a high energy density can be provided.

Second Embodiment

In the second embodiment, a nonaqueous electrolyte battery is provided. The nonaqueous electrolyte battery comprises a negative electrode, a positive electrode, a nonaqueous electrolyte, a separator and a container. In this embodiment, the negative electrode comprises a battery active material according to the first embodiment as a negative electrode active material.

Hereinafter, the negative electrode, positive electrode, nonaqueous electrolyte, separator, and container will be explained in detail.

1) Negative Electrode

The negative electrode comprises a current collector and a negative electrode layer (namely, negative electrode active material-containing layer). The negative electrode layer is formed on one or both surfaces of the current collector and contains a negative electrode active material, and optionally, a conductive agent and a binder.

The negative electrode active material comprises the battery active material explained in the first embodiment. The negative electrode using such a negative electrode active material can provide a nonaqueous electrolyte battery being superior in productivity, having excellent rapid charge/discharge performance and a high energy density.

Though the battery active material explained in the first embodiment may be singly used as the negative electrode active material, other compounds may be blended. When other compounds are blended, the battery active material explained in the first embodiment is preferably contained in a ratio of 10% by mass to 90% by mass based on the total mass of the negative electrode active material. Examples of these other compounds include Ti dioxide ($TiO_2$) having an anatase structure, lithium titanate having a ramsdelite structure (for example, $Li_2Ti_3O_7$) and lithium titanate having a spinel structure (for example, $Li_4Ti_5O_{12}$).

The conductive agent is formulated to improve the current-collecting performance and to restrain the contact resistance between the active material and the current collector. Examples of the conductive agent include carbonaceous material such as acetylene black, carbon black, and graphite.

The binder is blended to fill clearances between the dispersed negative electrode active materials and also to bind the active material with the current collector. Examples of the binder include a polytetrafluoroethylene (PTFE), polyvinylidene fluoride (PVdF), fluoro-rubber, and styrene-butadiene rubber.

The active material, conductive agent, and binder in the negative electrode layer are preferably blended in ratios of 68% by mass to 96% by mass, 2% by mass to 30% by mass, and 2% by mass to 30% by mass respectively. When the amount of the conductive agent is 2% by mass or more, the current collecting performance of the negative electrode layer can be improved. Furthermore, when the amount of the binder is 2% by mass or more, the binding strength between the negative electrode layer and the current collector is satisfactory and excellent cycle performances may be expected. On the other hand, the amounts of the conductive agent and binder are respectively preferably 30% by mass or less with the view of developing a high-capacity battery.

As the current collector, a material which is electrochemically stable at the lithium absorption and release potential of the negative electrode active material is used. The current collector is preferably made of Cu, Ni, stainless or Al, or an aluminum alloy containing at least one element selected from Mg, Ti, Zn, Mn, Fe, Cu, and Si. The thickness of the current collector is preferably 5 to 20 µm. A current collector having such a thickness can keep the balance between the strength of the negative electrode and light-weight performances. The thickness of the current collector is preferably 5 to 20 µm. A current collector having such a thickness can keep the balance between the strength of the negative electrode and light-weight performances.

The negative electrode can be manufactured by, for example, suspending the negative electrode active material, binder and conductive agent in a usual solvent to prepare a slurry, by applying this slurry to the surface of the current collector and by drying to form a negative electrode layer, which is then pressed.

Alternatively, the negative electrode can be manufactured by mixing the negative electrode active material, binder, and the conductive agent, forming the mixture into a pellet. The pellet can be used as the negative electrode layer. The pellet is placed on the current collector.

2) Positive Electrode

The positive electrode comprises a current collector and a positive electrode layer (namely, positive electrode active material-containing layer). The positive electrode layer is formed on one or both surfaces of the current collector and contains a positive electrode active material, and optionally, a conductive agent and a binder.

Examples of the positive electrode active material include oxides and sulfides. Specific examples of the positive electrode active material include manganese dioxide ($MnO_2$), iron oxide, copper oxide, and nickel oxide impregnated with lithium, lithium-manganese composite oxide (such as $Li_xMn_2O_4$ or $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $Li_xMn_yCo_{1-y}O_2$), lithium-manganese-nickel composite oxide having a spinel structure ($Li_xMn_{2-y}Ni_yO_4$), lithium-phosphorous oxide having an olivine structure (such as $Li_xFePO_4$, $Li_xFe_{1-y}Mn_yPO_4$ and $Li_xCoPO_4$), iron sulfate [$Fe_2(SO_4)_3$], vanadium oxide (such as $V_2O_5$) and lithium-nickel-cobalt-manganese composite oxide. Here, x and y satisfy the following equations: $0<x\leq1$ and $0<y\leq1$. As the active material, these compounds may be used either independently or in combinations of two or more.

Preferable examples of the positive electrode active material include oxides having a high positive electrode voltage, for example, lithium-manganese composite oxide (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-nickel composite oxide having a spinel structure (for example, $Li_xMn_{2-y}Ni_yO_4$), lithium-manganese-cobalt composite oxide (for example, $Li_xMn_yCo_{1-y}O_2$), Lithium-iron phosphate (for example, $Li_xFePO_4$) and lithium-nickel-cobalt-manganese composite oxide. Here, x and y satisfy the following equations: $0<x\le1$ and $0<y\le1$.

When a cold molten salt is used as the nonaqueous electrolyte, preferable examples of the active material include lithium-iron phosphate, $Li_xVPO_4F$ ($0\le x\le1$), lithium-manganese composite oxide, lithium-nickel composite oxide and lithium-nickel-cobalt composite oxide. Because each of these compounds is less reactive with a cold molten salt, the battery can be improved in cycle life.

The average primary particle diameter of the positive electrode active material is preferably 100 nm to 1 µm. A positive electrode active material having an average primary particle diameter of 100 nm or more is easily handled in industrial production. A positive electrode active material having an average primary particle diameter of 1 µm or less enables lithium ions to diffuse smoothly in solid.

The specific surface area of the positive electrode active material is preferably 0.1 $m^2/g$ to 10 $m^2/g$. A positive electrode active material having a specific surface area of 0.1 $m^2/g$ or more can secure lithium ion-absorption and release sites sufficiently. A positive electrode active material having a specific surface area of 10 $m^2/g$ or less is easily handled in industrial production and ensures a good charge-discharge cycle performance.

The binder is formulated to bind the active material with the current collector. Examples of the binder include a polytetrafluoroethylene (PTFE), polyvinylidene fluoride (PVdF) and fluoro-rubber.

The conductive agent is formulated as required to improve the current collecting ability of the active material and to reduce the contact resistance between the active material and the current collector. Examples of the conductive agent include carbonaceous materials such as acetylene black, carbon black, and graphite.

The active material and binder in the positive electrode layer are preferably formulated in ratios of 80% by mass to 98% by mass and 2% by mass to 20% by mass respectively. When the amount of the binder is 2% by mass or more, satisfactory electrode strength is obtained. Further, when the amount of the binder is 20% by mass or less, the amount of the insulating material of the electrode can be reduced, leading to reduced internal resistance.

When the conductive agent is added, the active material, binder and conductive agent are preferably formulated in ratios of 77% by mass to 95% by mass, 2% by mass to 20% by mass and 3% by mass to 15% by mass respectively. The conductive agent can produce the aforementioned effect by blending it in an amount of 3% by mass or more. When its amount is designed to be 15% by mass or less, on the other hand, the decomposition of the nonaqueous electrolyte on the surface of the conductive agent can be reduced even when the battery is stored at high temperatures.

The current collector is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 µm to 20 µm and more preferably 15 µm or less. The purity of the aluminum foil is 99% by mass or more. The content of transition metals such as Fe, Cu, Ni and Cr contained in the aluminum foil or aluminum alloy foil is preferably designed to be 1% by mass or less.

The positive electrode can be manufactured by, for example, suspending the positive electrode active material and binder and the conductive agent if necessary, in an appropriate solvent to prepare a slurry, by applying this slurry to the surface of the current collector and drying to form a positive electrode layer, which is then pressed.

Alternatively, the positive electrode can be manufactured by mixing the positive electrode active material and binder, and the conductive agent if necessary, forming the mixture into a pellet. The pellet can be used as the positive electrode layer. The pellet is placed on the current collector.

3) Nonaqueous Electrolyte

Examples of the nonaqueous electrolyte include a liquid nonaqueous electrolyte and a gel-like nonaqueous electrolyte. The liquid nonaqueous electrolyte is prepared by dissolving an electrolyte in an organic solvent. The gel-like nonaqueous electrolyte is prepared by forming a composite of a liquid electrolyte and a polymer material.

The liquid nonaqueous electrolyte is dissolved in an organic solvent in a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably one which is scarcely oxidized even at a high potential and $LiPF_6$ is most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoethane (DEE), γ-butyrolactone (GBL), acetonitrile (AN) and sulfolan (SL). These organic solvents may be used either singly or in combinations of two or more.

Examples of the polymer material include a polyvinylidene fluoride (PVdF), polyacrylonitrile (PAN) and polyethylene oxide (PEO).

A cold molten salt (ionic melt) containing lithium ions, polymer solid electrolyte, inorganic solid electrolyte and the like may also be used as the nonaqueous electrolyte.

The cold molten salt (ionic melt) means compounds which may exist in a liquid state at normal temperature (15 to 25° C.) among organic salts constituted of combinations of organic cations and anions. The cold molten salts include those which singly exist in a liquid state, those which are put into a liquid state when mixed with an electrolyte and those which are put into a liquid state when dissolved in an organic solvent. Generally, the melting point of the cold molten salt used in a nonaqueous electrolyte battery is 25° C. or less. Further, the organic cation generally has a quaternary ammonium skeleton.

The polymer solid electrolyte is prepared by dissolving an electrolyte in a polymer material and by solidifying the electrolyte mixture.

The inorganic solid electrolyte is a solid material having lithium ion-conductivity.

4) Separator

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making it possible to shut off current and is therefore preferable from the viewpoint of improving safety.

5) Container

A container made of a laminate film or a metal container may be used. The laminate film preferably has a thickness of 0.5 mm or less. The metal container preferably has a thickness of 1 mm or less. The thickness of the laminate film is more preferably 0.2 mm or less. The metal container has a thickness of, more preferably, 0.5 mm or less and most preferably 0.2 mm or less.

Examples of the shape of the container include a flat type (thin type), angular type, cylinder type, coin type and button type. The container having a size corresponding to the dimensions of a battery are used. For example, containers for small-sized batteries to be mounted on portable electronic devices and containers for large-sized batteries to be mounted on, for example, two- to four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon and polyethylene terephthalate (PET) may be used for the resin layer. The laminate film can be molded into a desired shape by sealing through thermal fusion.

The metal container is made of Al, an aluminum alloy or the like. The aluminum alloy is preferably an alloy containing one or more elements selected from magnesium, zinc, and silicon. When the alloy contains transition metals such as Fe, Cu, Ni and Cr, the amount of the transition metals is preferably 1% by mass or less.

6) Nonaqueous Electrolyte Secondary Battery

Next, the nonaqueous electrolyte battery according to the second embodiment will be explained in more detail with reference to the drawings. FIG. 3 is a sectional view of a flat type nonaqueous electrolyte secondary battery. FIG. 4 is an enlarged sectional view of the A-part of FIG. 3. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate.

The negative electrode 3 comprises a negative electrode current collector 3a and a negative electrode layer 3b. The outermost negative electrode 3 has a structure in which a negative electrode layer 3b is formed on one inside surface of a negative electrode current collector 3a as shown in FIG. 4. Other negative electrodes 3 each have a structure in which a negative electrode layer 3b is formed on each surface of the current collector 3a.

The positive electrode 5 comprises a positive electrode current collector 5a and a positive electrode layer 5b. The positive electrode layer 5b is formed on each surface of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. The negative electrode terminal 6 and positive electrode terminal 7 are externally extended from an opening part of the baggy container 2. A liquid nonaqueous electrolyte is injected from the opening part of the baggy container 2. The opening part of the baggy container 2 is closed by heat sealing with the negative electrode terminal 6 and positive electrode terminal 7 extended out of the opening part to thereby perfectly seal the coil electrode group 1 and liquid nonaqueous electrolyte.

The negative electrode terminal 6 is made of, for example, a material having electric stability and conductivity at the Li-absorption and release potential of the negative electrode active material. Specifically, examples of these materials include Cu, Ni, stainless and Al. The negative electrode terminal 6 is preferably made of the same material as the negative electrode current collector 3a to reduce the contact resistance with the negative electrode current collector 3a.

The positive electrode terminal 7 is made of, for example, a material having electric stability and conductivity in a potential range from, preferably, 3 V to 5 V based on metal lithium. Specific examples of these materials include Al and aluminum alloys containing elements such as Mg, Ti, Zn, Mn, Fe, Cu and Si. The positive electrode terminal 7 is preferably made of the same material as the positive electrode current collector 5a to reduce the contact resistance with the positive electrode current collector 5a.

Figure 5:
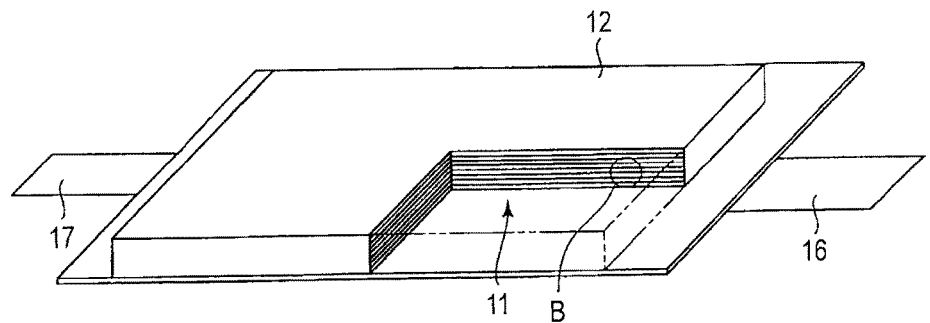
FIG. 5 is a partially broken perspective view of another flat type nonaqueous electrolyte battery according to the second embodiment.
Figure 6:
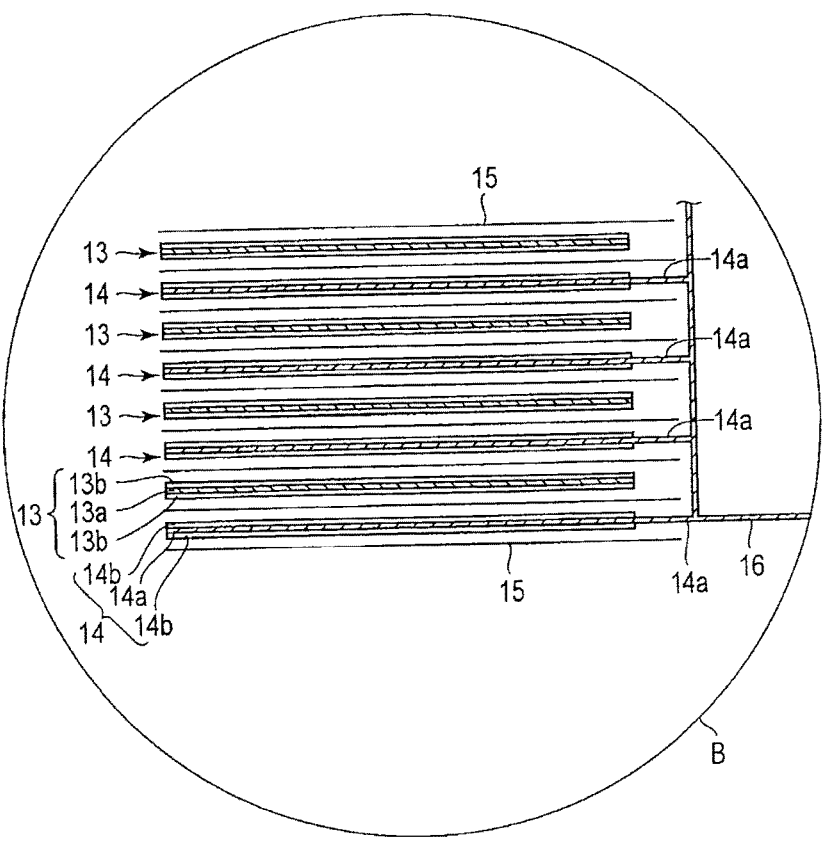
FIG. 6 is an enlarged sectional view of the part B of FIG. 5.

The nonaqueous electrolyte secondary battery according to the second embodiment is not limited to the structure shown in FIG. 3 and FIG. 4 and may have a structure as shown in, for example, FIG. 5 and FIG. 6. FIG. 5 is a partly broken perspective view typically showing another flat type nonaqueous secondary battery, and FIG. 6 is an enlarged sectional view of the B part of FIG. 5.

A laminate type electrode group 11 is accommodated in a container 12 made of a laminate film obtained by interposing a metal layer between two resin layer. The laminate type electrode group 11 has a structure in which a positive electrode 13 and a negative electrode 14 are, as shown in FIG. 6, alternately laminated with a separator 15 interposed therebetween.

The positive electrodes 13 exist in plural, each being provided with a current collector 13a and a positive electrode active material-containing layer 13b formed on each side of the current collector 13a.

The negative electrodes 14 exist in plural, each being provided with a current collector 14a and a negative electrode active material-containing layer 14b carried on each side of the current collector 14a.

One side of the current collector 14a of each negative electrode 14 is projected from the negative electrode 14. The projected current collector 14a is electrically connected to a band-shaped negative electrode terminal 16. The end of the band-shaped negative electrode terminal 16 is externally drawn out of the container 12.

Further, though not illustrated, one side of the positive electrode current collector 13a of the positive electrode 13, which side is positioned on the side opposite to the projected side of the negative electrode current collector 14a, is projected from the positive electrode 13. The current collector 13a projected from the positive electrode 13 is electrically connected to a band-shaped positive electrode terminal 17. The end of the band-shaped positive electrode terminal 17 is positioned opposite to the negative electrode terminal 16 and drawn out of the side of the container 12.

According to the above embodiment, a nonaqueous electrolyte battery which is superior in productivity and has excellent rapid charge/discharge performance and a high energy density can be provided.

Third Embodiment

Next, a battery pack according to a third embodiment will be explained with reference to the drawings. The battery pack comprises one or two or more of the above nonaqueous electrolyte batteries (unit cells) according to the second embodiment. When the battery pack includes two or more unit cells, these unit cells are disposed in such a manner that they are electrically connected in series or in parallel.

Figure 7:
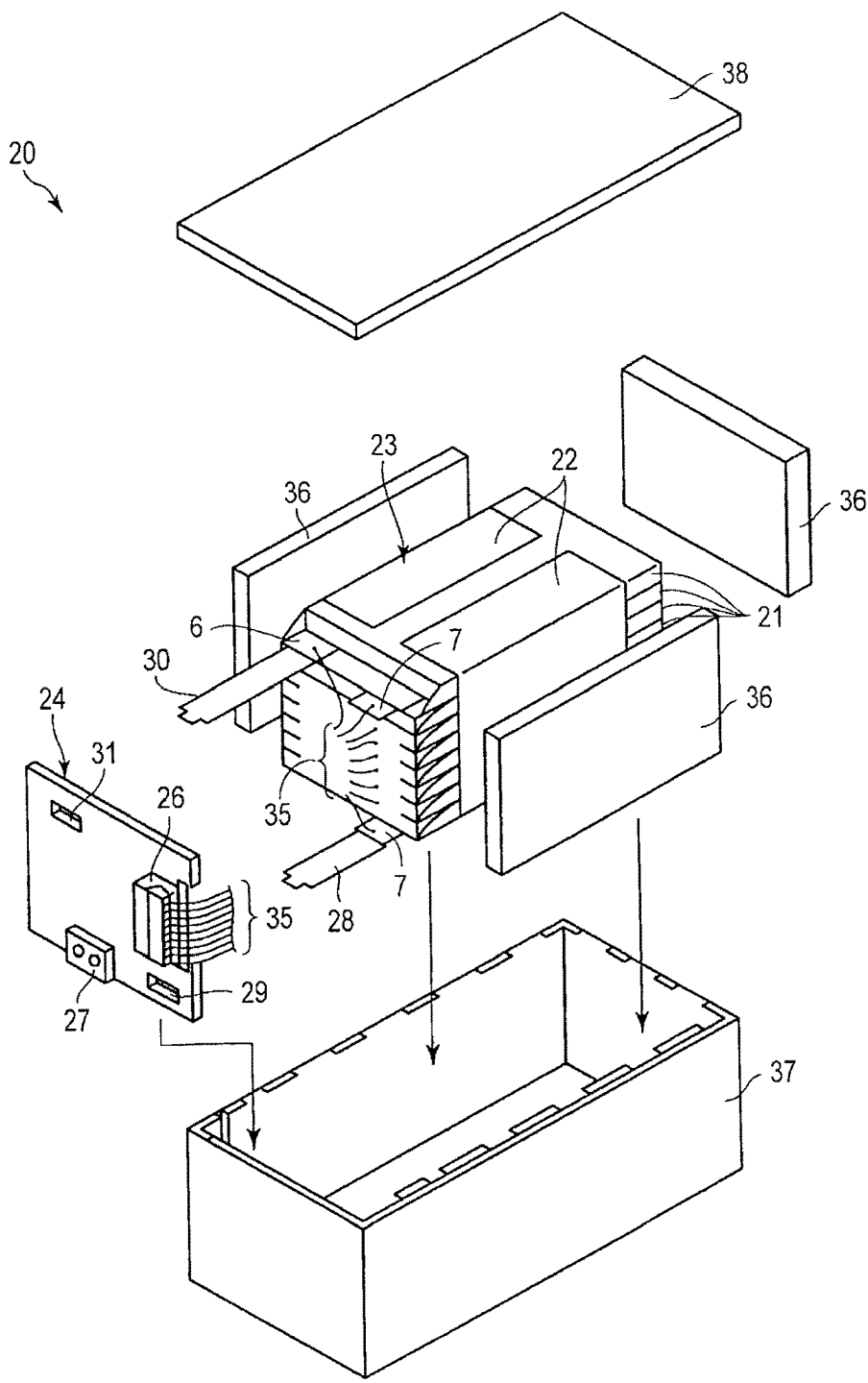
FIG. 7 is an exploded perspective view of a battery pack according to a third embodiment.
Figure 8:
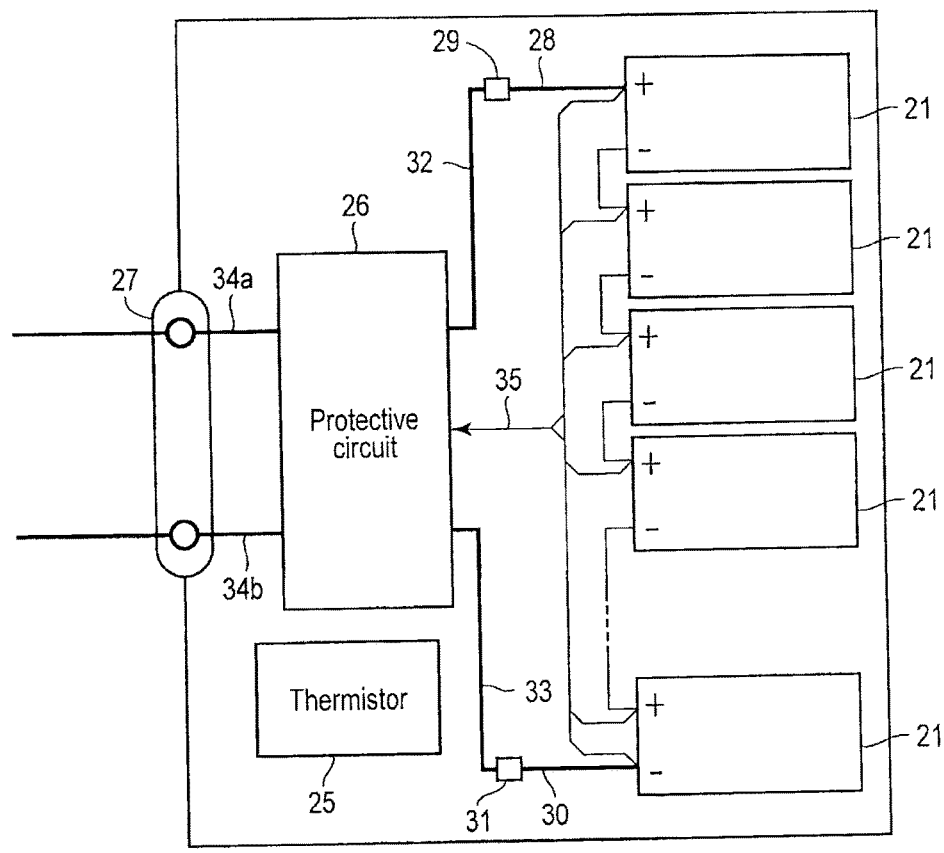
FIG. 8 is a block diagram showing the electric circuit of the battery pack of FIG. 7.

FIG. 7 and FIG. 8 show an example of a battery pack 20. This battery pack 20 comprises two or more flat-type unit cells 21 each having the structure shown in FIG. 3. FIG. 7 is an exploded perspective view of the battery pack 20. FIG. 8 is a block pattern showing the electric circuit of the battery pack 20 shown in FIG. 7.

A plurality of unit cells 21 are laminated such that the externally extended negative electrode terminal 6 and positive electrode terminal 7 are arranged in the same direction and fastened with an adhesive tape 22 to thereby constitute a battery module 23. These unit cells 21 are electrically connected in series as shown in FIG. 8.

A printed wiring board 24 is disposed opposite to the side surface of the unit cell 21 from which the negative electrode terminal 6 and positive electrode terminal 7 are extended. As shown in FIG. 8, a thermistor 25, a protective circuit 26 and an energizing terminal 27 connected to external devices are mounted on the printed wiring board 24. An insulating plate (not shown) is attached to the surface of the protective circuit substrate 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detects the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 7 and FIG. 8, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a receiving container 37 together with each protective sheet 36 and printed wiring board 24. Specifically, the protective sheet 36 is disposed on each inside surface in the direction of the long side and on one of the inside surfaces in the direction of the short side of the receiving container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the receiving container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 7 and FIG. 8. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to the above embodiment, a battery pack which is superior in productivity and has excellent rapid charge/discharge performance and a high energy density can be provided.

EXAMPLES

The embodiment will be explained in more detail by way of examples. The identification of the crystal phase and estimation of crystal structure of the synthesized complex oxide containing Nb and Ti were made by the XRD method using Cu-Kα rays. Furthermore, the composition of the product was analyzed by the ICP method to confirm whether a target product was obtained or not. Further, the state of the element M was analyzed by TEM observation and EPMA measurement. Further, the DSC measurement of an obtained sample was made to examine the melting point of the sample from the apex position of endothermic peak.

Example 1

(Synthesis of a Complex Oxide Containing Nb and Ti)

Among complex oxides containing Nb and Ti represented by the formula $Li_xTiNb_{2-y}M_yO_{7+\delta}$ ($0 \leq x \leq 5$, $0 \leq y \leq 0.5$, $-0.3 \leq \delta \leq 0.3$), a compound represented by the formula $TiNb_{1.9}Mo_{0.075}Mg_{0.025}O_7$ was synthesized. When $M=(Mo_{0.75}Mg_{0.25})$, $x=0$, $y=0.1$ and $\delta=0$, the compound was obtained. The composition was determined such that Nb in the crystal lattice was substituted by the element M, and then the electrochemical neutrality was maintained. In this complex oxide containing Nb and Ti, the molar ratio (M/Ti) was 0.1 and the molar ratio (Nb/Ti) was 1.9.

As starting materials, commercially available oxide reagents $Nb_2O_5$, $TiO_2$, $MoO_3$, and MgO were used. Powders of these starting materials were weighed in the same molar ratio as that of the structural elements of $TiNb_{1.9}Mo_{0.075}Mg_{0.025}O_7$ and mixed in a mortar. The obtained mixture was then introduced into an electric furnace and sintered at 1000° C. for a total of 36 hours.

(Measurement of XRD, TEM, and Melting Point)

The synthesized compound was measured by XRD, TEM, EMPA and DSC.

The synthesized compound was measured by XRD in the following manner. First, the sample was ground until the average particle diameter reached about 10 μm. The ground sample was filled in a holder part which was formed on a glass sample plate and had a depth of 0.2 mm. Then, a separate glass plate was used to smooth the surface of the sample by sufficiently pressing the separate glass plate against the sample. Then, the glass plate filled with the sample was set to a powder X-ray diffractometer, and a diffraction pattern was obtained by using Cu-Kα rays. As a result, it was identified that the synthesized compound had a target monoclinic complex oxide.

Further, it was found from the TEM observation and EMPA measurement that elements Mo and Mg entered into a crystal lattice to form element M substituted solid solution.

The melting point was measured by DSC in the following manner. Alumina was used as a standard material. The temperature rise rate was 5° C./min. The sample was filled in an alumina pan so carefully that the sample was filled with sufficiently density. The sample was measured at a temperature range from ambient temperature to an upper limit temperature of 1000 to 1500° C. As a result, the melting point of the sample was 1260° C.

The molar ratios M/Ti and Nb/Ti, sintering temperature and melting point are shown in Table 1.

(Production of an Electrochemical Measuring Cell)

The complex oxide containing Nb and Ti synthesized above was blended with acetylene black used as a conductive agent. 10 parts by mass of acetylene black was mixed with 100 parts by mass of the complex oxide. This mixture was dispersed in N-methyl-2-pyrrolidone (NMP). A polyvinylidene fluoride (PVdF) was mixed as a binder with the obtained dispersion solution to produce an electrode slurry. PVdF was used in an amount of 10 parts by mass based on 100 parts by mass of the complex oxide. This slurry was applied to each surface of a current collector made of an aluminum foil by using a blade. Then, the slurry was dried at 130° C. under vacuum for 12 hours to obtain an electrode.

Ethylene carbonate and diethyl carbonate were mixed in a ratio by volume of 1:1 to prepare a mixture solvent. Lithium hexafluorophosphate was dissolved in a concentration of 1 M in this mixture solvent to prepare a nonaqueous electrolyte.

The electrode manufactured above, a metal lithium foil as a counter electrode, and the nonaqueous electrolyte were used to produce an electrochemical measuring cell.

(Electrochemical Measurement)

A charge/discharge test was carried out using the electrochemical measuring cell. The charge/discharge was carried out at a potential range from 1.0 to 3.0 based on metal lithium electrode and at a charge/discharge current of 0.2 C (hourly discharge rate).

Next, the charge/discharge was repeated 50 cycles (charge/discharge operations make one cycle) to determine the discharge capacity retention ratio after 50 cycles. The charge/discharge operations were carried out at a potential range from 1.0 to 3.0 Vbased on metal lithium electrode, at a current of 1 C (hourly discharge rate) at ambient temperature (25° C.).

After 50 cycles, charge/discharge operations were carried out again at a current of 0.2 C (hourly discharge rate) to determine the discharge capacity. The capacity retention ratio (%) after 50 cycles was calculated when the initial discharge capacity was set to 100%.

Further, the rate performance of the cell was investigated. A discharge capacity at a current of 0.2 C, 1.0 C and 5.0 C were measured. Then, the discharge capacity ratios of the discharge capacity at a current of 1.0 C and 5.0 C to the discharge capacity at a current of 0.2 C were calculated, respectively.

Table 2 shows the first discharge capacity, first charge/discharge efficiency (%), discharge capacity maintenance ratio (%) after 50 cycles, 1 C discharge capacity and capacity ratio, and 5 C discharge capacity and capacity ratio.

Example 2

(Synthesis of a Complex Oxide Containing Nb and Ti)

Among complex oxides containing Nb and Ti represented by the formula $Li_xTiNb_{2-y}M_yO_{7+\delta}$ ($0 \le x \le 5$, $0 \le y \le 0.5$, $-0.3 \le \delta \le 0.3$), a complex oxide which has a crystal structure represented by $TiNb_2O_7$ and in which V existed as a solid solution was synthesized. When x=0, y=0 and δ=0, the compound was obtained.

As starting materials, $Nb_2O_5$, $TiO_2$, and $V_2O_5$ were used. $Nb_2O_5$ and $TiO_2$ were mixed in a molar ratio of 1:1. $V_2O_5$ was added in such a proportion that the molar ratio (M/Ti) was 0.01. In this synthetic method, the element V was expected to function as a flux. Thus, the element V need not exist as a solid solution. Therefore, the element V was added in a manner that electrochemical neutrality was not maintained.

(Measurement of XRD, TEM, and Melting Point)

The synthesized compound was measured in a similar manner to that in Example 1. As a result, it was identified that the synthesized compound comprised a monoclinic complex oxide.

Further, it was found from the TEM observation and EPMA measurement that the element V was segregated in a part of a domain constituting the crystal. This suggested that the element V was not existed as a solid solution. The melting point of the complex oxide obtained by DSC measurement was 1310° C. Thus, depression of melting point due to a flux effect was confirmed.

Table 1 shows the molar ratios M/Ti and Nb/Ti, sintering temperature, and melting point.

(Electrochemical Measurement)

An electrochemical measuring cell was produced in the similar manner to that in Example 1. The electrochemical measurement was carried out using the electrochemical measuring cell in the similar manner to that in Example 1. The results are shown in Table 2.

Comparative Example 1

(Synthesis of a Complex Oxide Containing Nb and Ti)

A compound represented by the formula $TiNb_2O_7$ was synthesized according to the method described in Reference Document 1. Specifically, a titanium oxide powder and a niobium pentoxide powder were weighed in a molar ratio of 1:1 and wet-mixing using ethanol was performed in a mortar. The obtained mixture was then placed in a platinum crucible and sintered at 1000° C. according to the method described in Example 1 of Reference Document 1. The sintering at 1000° C. is processing which can be performed by a conventional production apparatus.

Table 1 shows the molar ratios M/Ti and Nb/Ti, sintering temperature, and melting point.

(Measurement of XRD, TEM, and Melting Point)

The synthesized compound was measured in a similar manner to that in Example 1. As a result, although main XRD peaks almost corresponded to those of $TiNb_2O_7$, the peaks were wide. So it was suggested that the synthesized compound had less crystallinity. Moreover, there was the possibility that an impurity phase existed. The impurity phase was considered to be caused by unreacted titanium dioxide. The melting point of the synthesized compound obtained by DSC measurement was 1475° C.

(Electrochemical Measurement)

An electrochemical measuring cell was produced in the similar manner to that in Example 1. The electrochemical measurement was carried out using the electrochemical measuring cell in the similar manner to that in Example 1. The results are shown in Table 2.

Comparative Example 2

(Synthesis of a Complex Oxide Containing Nb and Ti)

A compound represented by the formula $TiNb_2O_7$ was synthesized according to the method described in Reference Document 1. Specifically, a titanium oxide powder and a niobium pentoxide powder were weighed in a molar ratio of 1:1 and wet-mixed using ethanol was performed in a mortar. The obtained mixture was then placed in a platinum crucible and sintered at 1300° C. according to the method described in Example 3 of Reference Document 1. The synthesized compound in Example 3 of Reference Document 1 is most superior in rate performance among compound described in Reference Document 1.

(Measurement of XRD, TEM, and Melting Point)

The synthesized compound was measured in a similar manner to that in Example 1. As a result, all XRD peaks corresponded to those of $TiNb_2O_7$. The peaks of Comparative Example 2 were narrower than that of Comparative Example 1. So it was suggested that the synthesized compound had high crystallinity. The melting point of the synthesized compound obtained by DSC measurement was 1475° C.

Table 1 shows the molar ratios M/Ti and Nb/Ti, sintering temperature, and melting point.

(Electrochemical Measurement)

An electrochemical measuring cell was produced in the similar manner to that in Example 1. The electrochemical measurement was carried out using the electrochemical measuring cell in the similar manner to that in Example 1. The results are shown in Table 2.

TABLE 1

|  | Molar ratio M/Ti | Molar ratio Nb/Ti | Sintering temperature (° C.) | Melting point (° C.) |
| --- | --- | --- | --- | --- |
| Example 1 | 0.1 | 1.9 | 1000 | 1260 |
| Example 2 | 0.010 | 2.00 | 1000 | 1310 |
| Comparative Example 1 | 0.000 | 2.00 | 1000 | 1475 |
| Comparative Example 2 | 0.000 | 2.00 | 1300 | 1475 |

TABLE 2

|  | First discharge capacity (mAh/g) | First charge/ discharge efficiency (%) | Discharge capacity maintenance ratio (%) | 1 C discharge capacity (mAh/g) (ratio to 0.2 C capacity) | 5 C discharge capacity (mAh/g) (ratio to 0.2 C capacity) |
| --- | --- | --- | --- | --- | --- |
| Example 1 | 276.3 | 93.5 | 96.6 | 271.9 (0.98) | 261.9 (0.95) |
| Example 2 | 273.1 | 92.8 | 96.4 | 269.3 (0.99) | 262.1 (0.96) |
| Comparative Example 1 | 258.1 | 83.8 | 72.8 | 193.5 (0.75) | 100.7 (0.39) |
| Comparative Example 2 | 265.2 | 90.5 | 86.7 | 236.0 (0.89) | 172.4 (0.65) |

<Results>

As shown in Table 2, Examples 1 and 2 were more improved in charge/discharge capacity, charge/discharge efficiency, capacity maintenance ratio and rate performance. In Comparative Example 1, the discharge capacity ratio of the discharge capacity at a current of 5.0 C to the discharge capacity at a current of 0.2 C was about 0.39, whereas those in Examples 1 and 2 were as high as 0.95 or more. Specifically, Examples 1 and 2 had a capacity ratio about 2.5 times higher than that of Comparative Example 1 in discharge capacity at a rate as high as 5.0 C. The synthesized compounds in Examples 1 and 2 and Comparative Example 1 were all heat-treated at 1000° C. at which high productivity was obtained. This shows that the synthesized compounds in Examples 1 and 2 have high crystallinity though they are sintered at a low temperature similarly to Comparative Example 1.

Further, it is shown that Examples 1 and 2 each had a high capacity maintenance ratio and enable stable charge/discharge.

Figure 9:
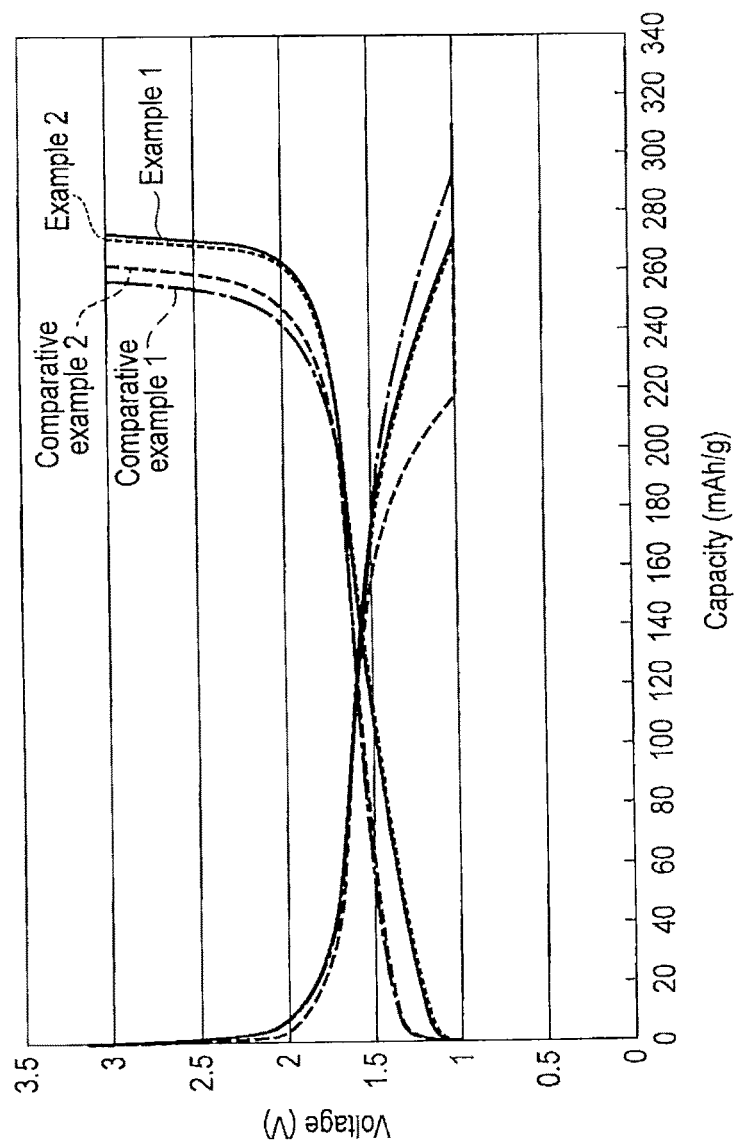
FIG. 9 shows a first charge/discharge curve each of measuring cells according to Examples 1 and 2 and Comparative Examples 1 and 2, respectively.

Next, the first charge/discharge curves of Examples 1 and 2 and Comparative Examples 1 and 2 are shown in FIG. 9. It is found from FIG. 9 that Examples 1 and 2 each have a higher capacity than Comparative Examples 1 and 2. Further, it is shown from the charge/discharge curve that the overvoltage was low in Examples 1 and 2. It was considered that the overvoltage was limited, since the electric conductive was improved by adding of the element M in Examples 1 and 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery active material, comprising a complex oxide of formula $Li_xTiNb_{2-y}M_yO_{7+\delta}$ ($0 \leq x \leq 5$, $0 \leq y \leq 0.5$, $-0.3 \leq \delta \leq 0.3$) and an element M,
wherein:
a molar ratio (M/Ti) of the element M to Ti in the active material satisfies the following formula (I):

$$0.1 \leq M/Ti \leq 0.5 \quad (I);$$

a molar ratio (Nb/Ti) of Nb to Ti in the complex oxide containing Nb and Ti satisfies the following formula (II):

$$1 \leq Nb/Ti \leq 5 \quad (II); \text{ and}$$

M comprises Mg and at least one element selected from the group consisting of V, B, Na, Al, Si, S, P, K, Ca, Mo, W, Cr, Mn, Co, Ni, and Fe.

2. The battery active material according to claim 1, wherein the complex oxide has a melting point of 1350° C. or less.

3. A nonaqueous electrolyte battery, comprising:
a negative electrode comprising the battery active material according to claim 1;
a positive electrode; and
a nonaqueous electrolyte.

4. A battery pack, comprising the nonaqueous electrolyte battery according to claim 3.

5. The battery pack according to claim 4, further comprising:
an external energizing terminal; and
a protective circuit.

6. The battery according to claim 3, wherein the negative electrode further comprises at least one battery active material selected from the group consisting of Ti dioxide having an anatase structure, lithium titanate having a ramsdelite structure and lithium titanate having a spinel structure.

7. The battery according to claim 3, wherein the positive electrode comprises at least one positive electrode active material selected from the group consisting of manganese dioxide, iron oxide, copper oxide, and nickel oxide impregnated with lithium, lithium-manganese composite oxide, lithium-nickel composite oxide, lithium-cobalt composite oxide, lithium-nickel-cobalt composite oxide, lithium-manganese-cobalt composite oxide, lithium-manganese-nickel composite oxide having a spinel structure, lithium-phosphorous oxide having an olivine structure, iron sulfate, vanadium oxide and lithium-nickel-cobalt-manganese composite oxide.

8. The battery according to claim 3, wherein the positive electrode, the negative electrode and the nonaqueous electrolyte are accommodated in a container.

9. The battery according to claim 8, wherein the container is made of laminate film having a thickness of 0.5 mm.

10. The battery according to claim 8, wherein the container is a metal container having a thickness of 1 mm or less.

11. A battery pack, comprising nonaqueous electrolyte batteries comprising the nonaqueous electrolyte battery according to claim 3, wherein the nonaqueous electrolyte batteries are connected in series, in parallel or with a combination of series connection and parallel connection.

12. The battery active material according to claim 1, wherein the complex oxide has a monoclinic crystal structure.

13. The battery active material according to claim 1, wherein the complex oxide has a BET specific surface area in the range of 0.1 m²/g or more and less than 100 m²/g.

14. The battery active material according to claim 1, wherein the element M comprises Mg and Mo.

15. A vehicle, comprising the battery pack according to claim 4.

* * * * *